March 17, 1953  F. TRATZIK  2,631,813
SEALING STRUCTURE FOR ROTARY PLUG VALVES
Filed Jan. 24, 1949
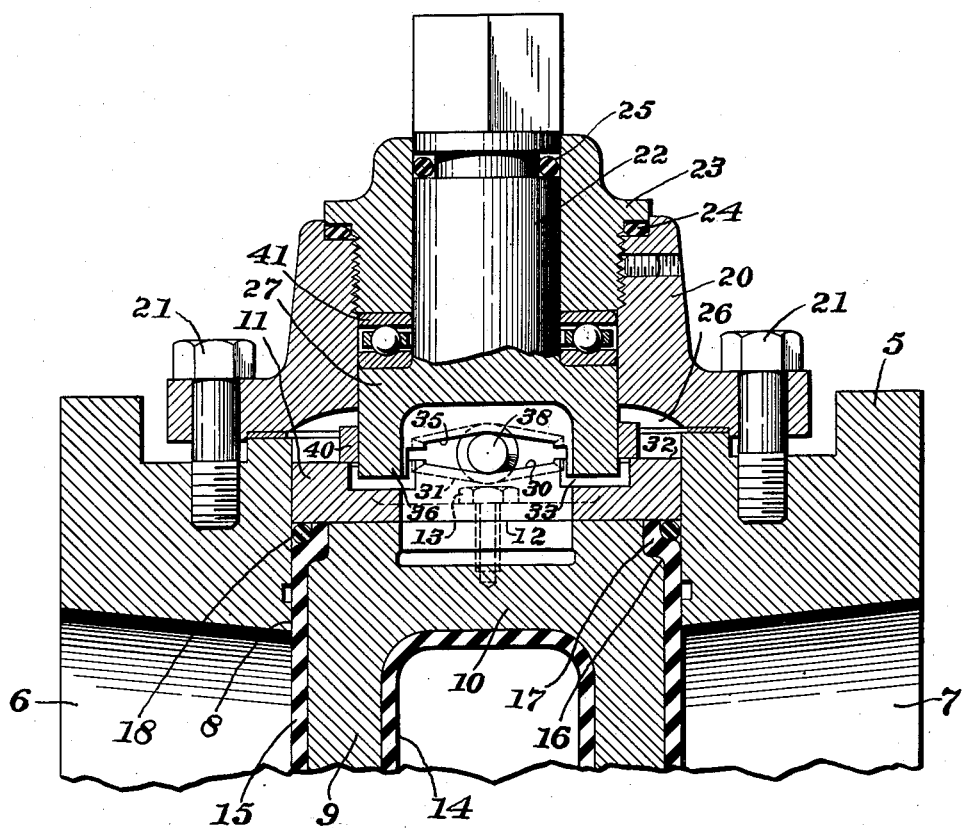
Frederick Tratzik
Inventor
By Cushman, Darby & Cushman
Attorneys Patented Mar. 17, 1953

2,631,813

UNITED STATES PATENT OFFICE 2,631,813

SEALING STRUCTURE FOR ROTARY PLUG VALVES

Frederick Tratzik, Decatur, Ill., assignor to Mueller Co., Decatur, Ill., a corporation of Illinois Application January 24, 1949, Serial No. 72,428

2 Claims. (Cl. 251—103)

This invention relates to valves of the rotary plug type. The application is a continuation-in-part of my application for Valves, Serial No. 632,659, filed December 4, 1945, and now abandoned.

Valves provided with a rubber covered seat afford an improved seal as compared to valves in which there is metal to metal contact. Nevertheless, there is some possibility of leakage and it is the purpose of the present invention to prevent this leakage in a simple and effective manner, in particular, past the operating end of the plug, that is, the end with which the usual operating stem is associated. Leakage past the other end of the plug is ordinarily of no moment since the casing is usually sealed at that end by an imperforate closure.

Objects of the invention are to provide a rubber-sealed valve which is of such design as to provide a highly satisfactory seal at the operating stem end, and includes efficient operating means. A further object is to provide a low cost valve including operating means of such arrangement as to enable the plug to be moved axially of its seat during rotation.

The accompanying drawing shows the operating end of the valve in axial section and with the plug in closed position.

Referring to the drawing, the numeral 5 designates a valve body or casing having opposed ports 6 and 7 which intersect a cylindrical seat 8. A valve element 9 is rotatable in seat 8. Element 9 includes a plug portion 10 and a plate portion 11 fixed to the operating stem end 12 of plug portion 10 by machine screws such as 13. Plug portion 10 includes a flow port 14. The diameter of the plug portion 10 is less than that of the seat 8 and accommodates an overall rubber covering 15 which is of such thickness as to provide sealing contact with seat 8.

The end 12 of plug portion 10 is flat, i. e., lies in a plane radial to the axis of the plug. This end of plug portion 10 is provided with a circumferential groove 16 including one radial wall and an inner wall. The opposite radial wall of the groove is formed by the adjacent and overhanging surface of plate portion 11, plate portion 11 being of such diameter as to closely fit seat 8. The rubber covering 15 has an inturned flange portion 17 overlying one radial wall of the groove, viz., the wall shown lowermost in the drawing. A peripheral or axial extension of flange 17 overlies the inner wall of the groove and its end abuts plate portion 11. Flange 17 thus provides a circumferential groove in which an O-ring 18 is positioned, the O-ring being confined in two directions by the flange 17 of the rubber covering and in a third direction by plate portion 11.

The O-ring 18 is of elastic rubber and is free in the groove. That is to say, it is free to be distorted by fluid pressure to provide a tight seal between the plug and the seat. Pressure reaching the ring from the inlet port of the valve when the valve element is in closed position acts to bulge the O-ring against the seat 8, the lower surface of plate portion 11 and the flange 17.

It will be understood that the cross-sectional shape of the O-ring need not necessarily be curved or round, but may be of other shapes, such as square, rectangular, or polygonal, depending upon the particular type or use of the valve. For example, if the valve is to control water pressure, an O-ring which is substantially square in cross-section will prove highly efficient.

The flange 17 is integral with the rubber covering 15 and the entire covering is bonded to the plug portion 9 in the molding operation. Flange 17, of itself, acts to prevent stripping of the rubber covering due to friction with the seat when the valve element is turned, the anti-stripping effect being enhanced by the engagement of O-ring 18 with the extension or flange 17.

By providing the O-ring, a structure which is non-leaking toward the operating end of the valve is provided.

The end of the body member 5 at which the operating stem is provided is closed by a plate 20 and is otherwise of the type disclosed in the application of Walter J. Bowan and Frederick Tratzik for Valves, Serial No. 611,465, filed August 20, 1945, and which matured to Patent No. 2,510,494 on June 6, 1950. As is disclosed in that application, a plate 20 is secured to the body member by bolts such as 21 and an operating stem 22 is rotatable in a collar 23 threaded in plate 20. An O-ring 24 may be provided between the plate 20 and collar 23 and a third O-ring 25 may be provided about the stem 22 within collar 23. The outer end of stem 22 is of such form as to receive an operating handle.

The plate 20 provides a chamber 26 in which the plate portion 11 of valve member 9 is positioned. The plate portion 11 and the enlarged inner end 27 of stem 22 are provided with cooperating means of the form disclosed in said Bowan and Tratzik application whereby the valve member 9 will be moved axially of the seat 8 during rotation. For present purposes, the operating connection can be described as follows: Plate portion 11 includes a pair of diametrically opposite and concentric concave cam surfaces 30, each of which is of V-shaped form circumferentially of the valve element. As is indicated by the dotted line 31, surface 30 lies at an acute angle to a radius of the valve member, with its point of greatest depth furtherest from the axis of the valve member. Each of the cam surfaces 30 extends through an arc of somewhat less than 60°, and these surfaces extend upwardly at their ends to the flat outer surface 32 of plate portion 11. Midway between the two cam surfaces 30, plate portion 11 is provided with diametrically opposite recesses 33.

The enlarged inner end 27 of operating stem 22 is provided with an annular axially extending flange. At diametrically opposite points, this flange has two concave, arcuate and V-shaped cam surfaces 35 formed therein which will normally lie directly opposite the cam surfaces 30 of plate portion 11. Projections 36 are formed midway between the ends of the cam surfaces 35, the projections being adapted to extend into the pockets or recesses 33 of the plate portion 11. The projections 36 have their end walls lying in planes which pass through the axis of the stem, and the end walls of the recess 33 also lie in such planes. However, the recesses 33 are of a length circumferentially of the valve element which is greater than the corresponding dimension of the projections 36. Therefore, the projections 36 have a loose fit with respect to the recesses, considered circumferentially of the valve element and operating stem.

A roller 38 is positioned between each cam surface 30 and the opposite cam surface 35. The rollers are tapered to conform to the surfaces of the cams and are rounded at their outer ends so that they will have a single point bearing upon the inner cylindrical surface of a holding ring 40 which fits about the inner portion 27 of the operating stem 22.

A roller bearing assembly 41 is positioned between the enlarged inner end 27 of stem 22 and the inner end of collar 23.

As is explained in said Bowan and Tratzik application, when the valve element 9 is to be moved to open position, rotation of the stem 22 will cause the cam surfaces 35 of the stem to so cooperate with the rollers 38, that the latter will act upon the cam surfaces 30 to move the valve element axially of the body member seat 8. By the time that the valve member has been slightly moved axially, the projections 36 of stem 22 will engage the walls of the recesses 33 to impart a positive rotation to the valve member. The axial movement of the valve member will cause the rubber covering to be freed from the seat 8 by such axial movement and before rotation occurs, thereby preventing the rubber covering from being marred as might be the case if it were rotated without axial movement.

The plate portion 11 can be formed of hardened steel or bronze and thus constitutes a very durable trackway for the rollers 38, whereas the plug portion 10 may be formed of iron or other cheaper material. The stem 22 also can be made of hardened metal so that both trackways will be durable in service.

If it is desired to renew the O-ring 18, the plate 20 can be removed and thereafter the plate portion 11 of valve element 9 can be removed. When a new O-ring has been inserted at 18, the removed parts will be replaced.

It will be perceived from the foregoing that the present arrangement provides a valve having an efficient seal at the operating end of the valve element. In addition, the parts provided to obtain axial movement of the valve member can be made highly durable without increasing the cost of the entire structure and the sealing O-ring 18 can be readily replaced.

The terminology used in the specification is for the purpose of description and not of limitation, the scope of the invention being defined in the claims.

I claim:

1. A valve comprising a casing member having inlet and outlet ports and a seat of circular cross-section between said ports, a rotary valve element in said seat including a plug portion and a plate portion, the plate portion being rigidly secured to one axial end of the plug portion, the plug portion being of slightly smaller diameter than the casing element seat, the plate portion being of substantially the same diameter as the casing member seat, the plug portion being grooved at its circumferential edge immediately adjacent the plate portion, an adhered rubber covering on the plug portion and engaging the casing member seat, the edge of the rubber covering adjacent the plate portion lying within the circumferential groove, the circumferential groove being of greater depth radially of the valve element than the thickness of the rubber covering within the groove, an O-ring positioned in the groove to lie against the plate portion and the rubber covering therein, as well as in opposed relation to the casing member seat, and valve operating means operatively associated with the plate portion.

2. A valve of the character described in claim 1 wherein said operating means and plate portion include cooperating means to move the valve element axially of the casing member seat upon rotation of said operating means.

FREDERICK TRATZIK.

REFERENCES CITED

The following references are of record in the file of this patent:

UNITED STATES PATENTS

| Number | Name | Date |
|---|---|---|
| 1,650,312 | Wildin et al. | Nov. 22, 1927 |
| 1,788,765 | Hamblin et al. | Jan. 13, 1931 |
| 2,285,222 | Mueller | June 2, 1942 |
| 2,371,657 | Stark | Mar. 20, 1945 |